United States Patent [19]

Wortman

[11] 4,278,847
[45] Jul. 14, 1981

[54] TRANSFORMERLESS HYBRID CIRCUITS

[75] Inventor: Donald W. Wortman, Central Islip, N.Y.

[73] Assignee: TII Corporation, Lindenhurst, N.Y.

[21] Appl. No.: 15,407

[22] Filed: Feb. 26, 1979

[51] Int. Cl.³ .............................................. H04B 1/58
[52] U.S. Cl. ............................. 179/170 NC; 179/2.51; 179/77
[58] Field of Search ................... 179/16 F, 18 FA, 70, 179/77, 170 R, 170 NC, 170 T, 2.5 R, 2.51

[56] References Cited

U.S. PATENT DOCUMENTS

| | | | |
|---|---|---|---|
| 3,035,122 | 5/1962 | Livingstone | 179/16 F |
| 3,601,538 | 8/1971 | May et al. | 179/2.5 R |
| 3,909,559 | 9/1975 | Taylor | 179/170 NC |
| 3,916,110 | 10/1975 | Lee et al. | 179/16 F |
| 3,955,052 | 5/1976 | Orbach | 179/18 FA |
| 4,041,252 | 8/1977 | Cowden | 179/170 NC |
| 4,064,377 | 12/1977 | Regan | 179/170 NC |
| 4,142,075 | 2/1979 | Olschewski | 179/170 NC |

*Primary Examiner*—John H. Wolff
*Assistant Examiner*—Randall P. Myers
*Attorney, Agent, or Firm*—Le Blanc, Nolan, Shur & Nies

[57] ABSTRACT

An electronic hybrid for coupling a two-wire line to a four-wire line and having a two-wire port adapted to be connected to the two-wire line, separate receive and transmit ports adapted to be connected to said four-wire line, means for coupling signals received at said two-wire port to said tramsmit port, and a circuit connected to said receive and two-wire ports and including a pair of constant current sources for driving the two-wire line that is connected to said two-wire port in response to a signal imposed on said receive port.

13 Claims, 3 Drawing Figures

TRANSFORMERLESS HYBRID CIRCUITS

FIELD OF INVENTION

This invention relates to transformerless hybrid circuits (also called electronic or solid state hybrid circuits) for coupling a pair of unidirectional signal transmission paths to a bidirectional signal transmission path in communication equipment.

BACKGROUND

Hybrid circuits are customarily used in various places as a signal interface between a bidirectional two-wire line or transmission path and the individual unidirectional sections or unidirectional transmission paths of a four-wire line. In telephone carrier systems, for example, a hybrid circuit is used as a junction between a two-wire drop or subscriber loop and a four-wire telephone carrier channel. Hybrid circuits are also used in the telephone set itself to couple the telephone's receiver and transmitter to a two-wire line.

The most commonly used hybrid circuit design is a hybrid transformer known as a hybrid coil. This type of hybrid circuit typically has a four winding transformer to provide a two-wire port, separate transmit and receive ports, and a balance network. The transformer windings are arranged in such a manner that signals imposed on the two-wire port are coupled to the transmit port and signals imposed on the receive port are coupled to the two-wire port, but not to the transmit port.

Hybrid transformers of the type described above have been in use for many years. They have, however, a number of drawbacks including relatively large size and high cost. To avoid these problems, various forms of transformerless or electronic hybrids have been proposed in the past such as the ones described in U.S. Pat. No. 4,004,109 which issued to F. S. Boxall on Jan. 18, 1977 and U.S. Pat. No. 4,064,377 which issued to J. F. Regan on Dec. 20, 1977.

In the Boxall patent signals are coupled between the two and four-wire lines by an arrangement of current mirrors. Such current mirrors, however, tend to be relatively expensive and are not readily available, low cost, off-the-shelf items.

The Regan patent avoids the use of current mirrors and hence the relatively high expense associated with such componentry. Regan's electronic hybrid circuit, however, is particularly designed for relatively high voltage supplies such as −48 VDC and is not suitable for low voltage supplies (e.g., −16 VDC) because of the voltage drops that are created by connecting terminating resistances in series with the conductors of the two-wire line. Additionally, the Regan hybrid circuit requires a carefully designed differential amplifier circuit to achieve the balance necessary for adequate common mode rejection.

The present invention has none of the foregoing drawbacks and instead is designed to be particularly suitable for use with low voltage supplies as well as affording the advantage of being manufacturable from inexpensive, off-the-shelf components. Additionally, the present invention affords several other advantages as will become apparent from the following summary and description of the invention.

SUMMARY AND OBJECTS OF INVENTION

In accordance with one embodiment of this invention a pair of constant current sources are used to drive the conductors or leads of the two-wire line, and the source terminating impedance for the two-wire line is shunted across the two conductors of the line without being connected to a.c. ground. This circuit design has low power loss and permits the use of relatively low voltage supplies. It additionally provides for a precisely balanced differential signal on the two-wire line without requiring the careful matching of series connected terminating resistances as is the case in the Regan patent mentioned above.

The constant current sources mentioned above are advantageously in the form of inexpensive, off-the-shelf bipolar transistors which are d.c. biased to provide battery feed (i.e., d.c. loop current) to the two-wire line. By using the transistor current sources as the battery feed, the direct current conducted through the two-wire line will advantageously remain constant regardless of the length of the line within the limits of the circuit design. The hybrid circuit of this invention may therefore be used without alterations for driving two-wire drops or subscriber loops of different length since the amount of direct current delivered to the line will not be dependent upon the length of the line.

Furthermore, the input power applied to the system consisting of the two-wire line and the transformerless hybrid circuit of this invention will not change with variations or changes in the length of the two-wire line. The power supply may therefore be designed so that only the minimum power necessary is used for maximum loop length. Wasteful dissapation of power is therefore avoided. In contrast the two-wire line in the Regan patent mentioned above is driven by a voltage source so that the input power and current will depend upon and vary as a function of the length of the loop or other two-wire line.

In addition to defining the current sources for driving the two-wire line, the bipolar transistors mentioned above are incorporated into a unique simplified circuit design whereby a single-ended signal from the four-wire unidirectional receive port of the hybrid is converted into a balanced differential signal for application to the two-wire line.

In this description a single-ended signal is considered to be a signal referenced from a one-conductor line to ground. A differential signal is considered to be the difference between two signals which are not necessarily referenced to ground.

The particular circuit design for converting the single-ended signal into the balanced differential signal also provides a cancellation signal voltage which is applied in the circuit of this invention to prevent an incoming signal from passing from the four-wire receive port to the four-wire transmit port.

Since the bipolar transistors mentioned above conduct the d.c. loop current that flows through the loop or other two-wire line which is connected to the hybrid circuit loop current supervision is readily made available for detecting or sensing changes in the magnitude of the loop current. This is accomplished by simply connecting a detecting or sensing circuit to an appropriate electrode of one of the two transistors.

In addition to being low in cost and reliable in operation the hybrid circuit of this invention is small in physical size and may be compactly packaged by virtue of having relatively few parts and no coils.

With the foregoing in mind the general aim and purpose of this invention is to provide a novel transformerless or electronic hybrid circuit which is suitable for use with relatively low voltage supplies and which can be manufactured from inexpensive, readily available, off-the-shelf components.

Another important object of this invention is to provide a novel transformerless hybrid circuit that can be used as a signal interface in various different applications. For example, the principles of this invention may be used as a signal interface between four-wire telephone carrier equipment and a two-wire drop circuit, or it can be used in telephone sets to couple a telephone's receiver and transmitter to a two-wire line or subscriber loop.

Still another important object of this invention is to provide a novel transformerless hybrid circuit in which two constant current sources are used for driving the respective conductors of the two-wire line. A more specific object of this invention is to provide a novel transformerless hybrid circuit in which the constant current sources mentioned in the preceding object take the form of bipolar transistors which also serve as the battery feed for the two-wire line.

Other important and related objects are the provision of a novel transformerless hybrid circuit which:
(1) is reliable in operation;
(2) is of relatively small physical size;
(3) has relatively few parts, particularly active devices having more than two electrodes;
(4) incorporates the two bipolar transistors mentioned above into a simplified circuit arrangement for converting a single-ended signal into a balanced differential signal as well as providing a cancellation voltage that prevents an incoming four-wire signal from being returned to the transmit path or section of the four-wire line; and
(5) affords effective rejection of longitudinal voltages or signals without significant expense.

Further objects of this invention will appear as the description proceeds in connection with the appended claims and the below described drawings.

DETAILED DESCRIPTION

Figure 1:
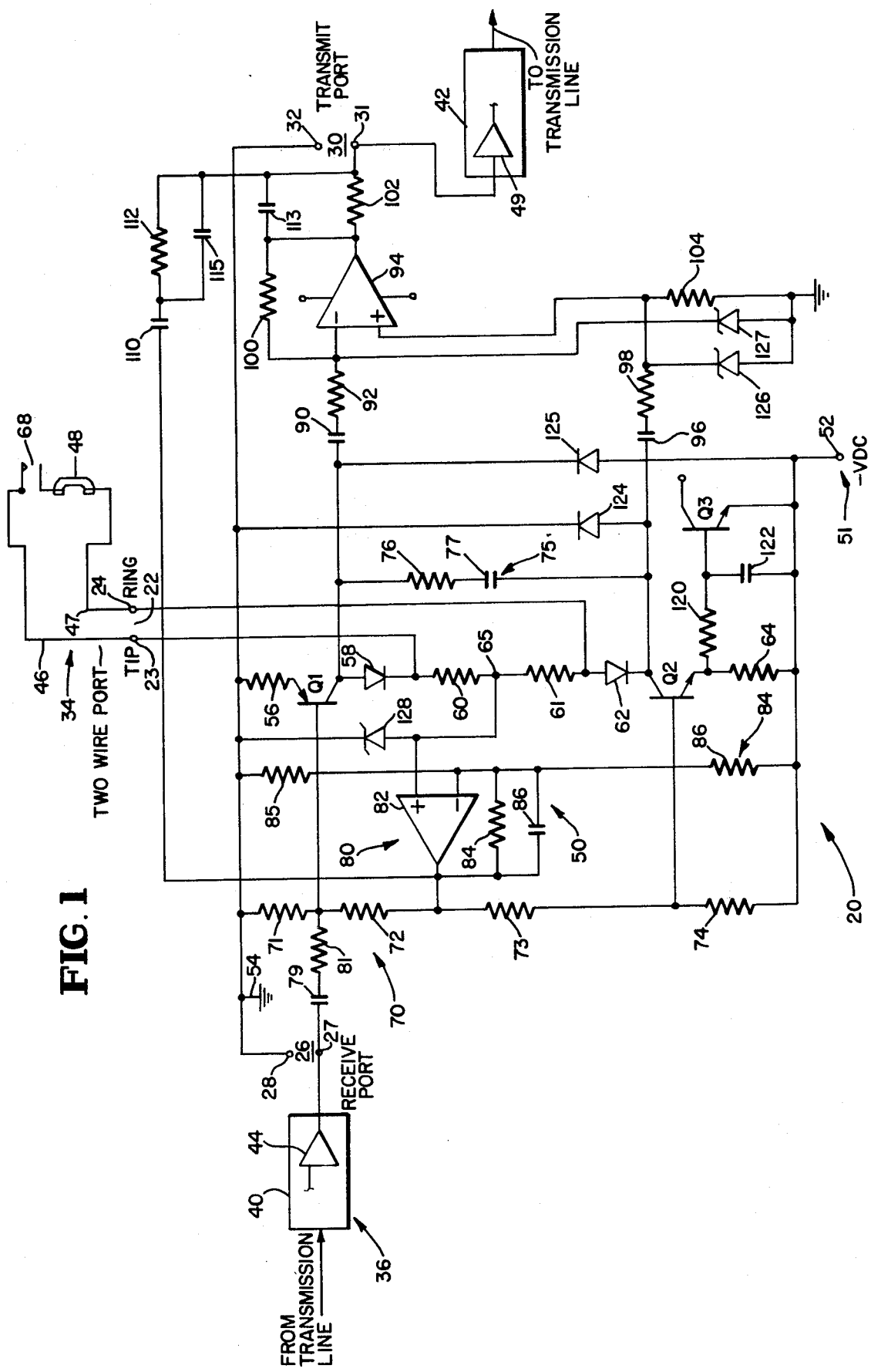
FIG. 1 is a schematic diagram of a transformerless or electronic hybrid circuit incorporating the principles of this invention and specifically designed for use as an interface between a subscriber drop or subscriber loop and a four-wire telephone carrier channel.

Referring to FIG. 1 one embodiment of a solid state or transformerless hybrid circuit incorporating the principles of this invention is generally indicated at 20 and comprises a bidirectional two-wire transmission port 22 having terminals 23 and 24, a unidirectional single-ended receive port 26 having an ungrounded terminal 27 and a grounded terminal 28, and a unidirectional single-ended transmit port 30 having an ungrounded terminal 31 and a grounded terminal 32. Incoming signals imposed on the unidirectional receive port 26 are coupled by the hybrid circuit to the bidirectional port 22. Incoming signals received at port 22 are coupled by the hybrid circuit to the unidirectional transmit port 30, but not the receive port 26.

In the embodiment illustrated in FIG. 1 the hybrid circuit of this invention is particularly designed for use as a signal interface between a two-wire drop or line 34 and the four-wire circuit of a telephone carrier channel in a subscriber carrier system. The subscriber carrier channel comprises a subscriber terminal circuit 36 which may be the same as the one shown in FIG. 4 of the U.S. Pat. No. 4,087,639, which issued on May 2, 1978. Such a subscriber terminal circuit has a communication receiver 40 and a communication transmitter 42.

In a typical carrier system design the receiver 40 is equipped to receive a carrier signal of pre-selected frequency and to detect the received carrier signal for recovering the modulating audio or voice frequency signal. The recovered audio signal is customarily fed to an expandor 44 in receiver 40. The audio signal output of expandor 44 is usually single-ended as shown and is connected to terminal 27 to impose the single-ended audio signal on receive port 26. Hybrid circuit 20 converts this incoming, single-ended audio signal into a balanced differential signal for application as an outgoing signal to the bidirectional port 20.

The two-wire line 34, or subscriber loop as it is also called, has a pair of conductors 46 and 47, one being the tip conductor, and the other being the ring conductor. Conductors 46 and 47 are respectively connected to the terminals 23 and 24 of the bidirectional port 22. Line 34 is connected to the subscriber's telephone 48 to couple the incoming differential audio signal to the telephone.

Differential audio signals transmitted from telephone 48 are fed to the bidirectional two-wire port 22 by way of line 34. Hybrid circuit 20 couples the outgoing audio signals in single-ended form to transmit port 30.

As shown, transmit port 30 may be coupled to a compressor 49 in transmitter 42. Transmitter 42 is also equipped to modulate an outgoing carrier signal with the audio signal that is fed to the transmitter from port 30.

The carrier signals received by and transmitted from the terminal circuit 36 are transmitted by way of a two-conductor transmission line which connects to the central office channel terminal equipment in the carrier system. Transmitter 42 and receiver 40 constitute a four-wire signal transmission circuit.

As shown in FIG. 1, hybrid circuit 20 comprises a pair of constant current sources in the form of bipolar transistors Q1 and Q2, respectively. These constant current sources (Q1 and Q2) are connected in series aiding relation to drive (i.e., to feed current to) the two-wire line 34. In this embodiment transistor Q1 is of the PNP type. Transistor Q2 is of the opposite polarity, being of the NPN type.

Transistors Q1 and Q2 provide battery feed (direct current) to the two-wire line 34 and form a part of a converting circuit 50 which is connected between ports 26 and 22. Circuit 50 operates to convert the incoming single-ended signal received at port 26 into a balanced differential signal for application to port 20 and hence to the conductors of line 34.

Transistors Q1 and Q2 are considered to be constant current sources because of their high collector output impedances. Both of these transistors are driven by a suitable voltage source or supply 51 having a negative terminal 52 and an earth grounded terminal. Terminal 52 is at a.c. ground.

As shown, the emitter of transistor Q1 is connected by way of an emitter resistor 56 to earth ground at 54, and the collector of transistor Q1 is coupled by way of a diode 58, two collector resistors 60 and 61 and a further diode 62 to the collector of transistor Q2. Resistors 60 and 61 are connected in series between diodes 58 and 62. The emitter of transistor Q2 is coupled by way of an emitter resistor 64 to the negative terminal 52 of voltage source 51.

By these circuit connections it will be appreciated that conduction of transistors Q1 and Q2 results in the flow of d.c. biasing current through a path that may be traced serially from the ground at 54, through resistor 56, through the emitter and collector electrodes of transistor Q1, through diode 58, through resistors 60 and 61, through diode 62, through the collector and emitter electrodes of transistor Q2 and through resistor 64 to the negative terminal of source 51.

The emitter resistor 56 sets the collector-emitter current for transistor Q1, while the emitter resistor 64 sets the collector-emitter current for transistor Q2. Resistors 56 and 64 are preferably equally sized (i.e., of equal resistances). Resistors 60 and 61 are equally sized and are large enough so that only a small d.c. biasing current is supplied for amplifier 82.

Resistors 60 and 61 form a voltage divider to make the collector-emitter voltages of transistors Q1 and Q2 equal to each other when the voltage at junction 65 (i.e., the junction between resistors 60 and 61) is at the midpoint of the voltage supply 51.

As shown, terminal 23 is connected to the junction between diode 58 and resistor 60, the terminal 24 is connected to the junction between resistor 61 and diode 62. By these circuit connections it will be appreciated that when the telephone 48 is lifted off-hook to close its hook switch 68, transistors Q1 and Q2, will cause direct current (also referred to as battery current) to flow through conductor 46, the telephone set 48 and conductor 47.

As shown, circuit 50 includes a voltage divider 70 which is connected across ground 54 and the negative voltage supply terminal 52 to provide the d.c. bias for transistors Q1 and Q2. Voltage divider 70 comprises resistors 71, 72, 73 and 74 all connected in series between ground and terminal 52. The base of transistor Q1 is connected to the junction between resistors 71 and 72, and the base of transistor Q2 is connected to the junction between resistors 73 and 74. By these circuit connections transistors Q1 and Q2 are d.c. biased for Class A operation by the voltage divider action of the resistors in divider 70. Transistors Q1 and Q2 will therefore be on and hence conducting all of the time to provide battery feed even when no audio signals are imposed on ports 22 and 26. As soon as hook switch 68 is closed, therefore, direct current for telephone 48 will be fed through line 34.

An impedance 75 for the two-wire line 34 is connected directly across the collectors of transistors Q1 and Q2. Impedance 75 is therefore shunted across the tip and ring conductors 46 and 47 of the two-wire line without being connected to or terminating in a.c. or any other ground. Impedance 75 constitutes the terminating impedance for signals transmitted from telephone 48 to hybrid 20 and the source impedance for signals transmitted from hybrid 20 to telephone 48. As shown, impedance 75 is in parallel with the telephone handset 48 and in parallel with the series connected resistors 60 and 61.

Thus, impedance 75 is not connected in series with one or the other of the conductors of the two-wire line 34 and consequently does not result in any voltage loss in the two-wire line. Instead, impedance 75 establishes a metallic connection (i.e., a non-grounded connection) bridging conductors 46 and 47.

As shown, impedance 75 consists of a resistor 76 and a d.c. blocking capacitor 77. Resistor 76 and capacitor 77 are connected in series between the collectors of transistors Q1 and Q2. Impedance 75 is therefore in series with the transistors Q1 and Q2 and hence in series with the constant current sources defined by transistors Q1 and Q2. The value of resistor 76 is typically 910 ohms.

From the foregoing description it will be appreciated that loop current (i.e., direct current) will flow through the two-wire line 34 and hence through the telephone handset 48 upon closure of hook switch 68. The current conducting path for the loop current may be traced from ground at 54, through the emitter-collector electrodes of transistor Q1, through tip conductor 46, through the hookswitch and telephone handset 48, through ring conductor 47, and through the collector-emitter electrodes of transistor Q2 to the negative terminal 52 of voltage supply 51.

The two-wire line 34 is therefore fed by d.c. collector current from transistors Q1 and Q2 which remains constant and does not change for different lengths of the two-wire line. The loop current conducted through the two-wire drop 34 will therefore be the same for different lengths of the two-wire line and also will not vary for different values of the telephone set impedance or other load that is connected to port 22 by line 34.

By feeding line 34 with the transistor constant current sources and by connecting the impedance 75 across line 34, rather than in series with line 34, relatively low voltage supplies (e.g., −16 VDC) can be used without problems.

Furthermore, decreasing the length of line 34 does not increase power usage. In this regard the input power applied by voltage supply 51 to power the combined circuit of hybrid 20, line 34 and telephone set 48 will remain constant and will not be changed by variations in the length of line 34. The voltage supply may therefore be designed to deliver only the minimum power necessary for a predetermined maximum length of line 34.

In the embodiment shown in FIG. 1 the single-ended signal imposed on receive port 26 is coupled to the base of transistor Q1 by a capacitor 79 and a resistor 81 which are connected in series between terminal 27 and the base of transistor Q1. A negative feedback 80, forming a part of circuit 50 and having a non-inverting amplifier 82, cooperates with transistors Q1 and Q2 to convert the received single-ended signal into the balanced differential signal for driving the two-wire port 22.

A voltage divider 84 sets the voltage at the negative input of amplifier 82 at a fixed, reference value. In this embodiment, divider 84 comprises a pair of equally sized resistors 85 and 86 connected in series between ground at 54 and the voltage supply's negative terminal 52. The negative input terminal of amplifier 82 is connected to the junction between resistors 85 and 86. For this circuit design the reference voltage is therefore fixed at the midpoint of the voltage supply. If the voltage supply is −16 VDC, for example, then the reference voltage at the amplifier's negative input will be −8 VDC. It will be appreciated that the reference voltage may be set to some value other than the midpoint of the voltage supply.

The output of amplifier 82 is connected to the junction between the voltage divider resistors 72 and 73. Resistors 72 and 73 are equally sized in this embodiment. Likewise, resistors 71 and 74 are equally sized. Amplifier 82 is provided with a local feedback network having a resistor 84 and a capacitor 86 connected in parallel with each other between the amplifier's output and the amplifier's negative input.

The junction 65 between resistors 60 and 61 is directly connected to the positive or non-inverting input terminal of amplifier 82. The voltage at the positive input of amplifier 82 will therefore be the voltage at junction 65. Accordingly, the voltage at the positive input of amplifier 82 will be equal to the fixed reference voltage at the negative input of amplifier 82 when the collector-emitter voltages of transistors Q1 and Q2 are equal to each other. For a −16 volt supply, the voltage at the positive input of amplifier 82 will therefore be −8 volts and thus the same as the reference voltage when the collector-emitter voltages of transistors Q1 and Q2 are equal. The amplified voltage at the output of amplifier 82 will deviate from the midpoint of the voltage supply by a magnitude proportional to the difference between the voltages at the amplifier's positive and negative input terminals.

The emitter and collector currents of transistor Q1 are virtually equal to each other. Likewise, the emitter and collector currents of transistors Q2 are virtually equal. Because transistors Q1 and Q2 are connected in series, neither one of the transistors will be able to draw significantly more emitter current than the other. Therefore, the emitter current of transistor Q2 will be equal to the emitter current of transistor Q1 even where the betas of the transistors are unequal as in the case of unmatched transistors. Under such a condition one of the two transistors will tend to draw somewhat more base current than what is needed until the feedback 80 makes the necessary correction.

In a practical circuit where unmatched, off-the-shelf transistors are used the betas of the two transistors are normally different. As a result, the collector-emitter voltages of transistors Q1 and Q2 will be unequal before corrective action is taken by feedback 80. Considering this situation in absence of any incoming audio signals the voltage applied to the positive input of amplifier 82 will initially deviate from the midpoint of the voltage supply and will either be more positive or more negative with respect to the fixed reference voltage at the negative input of amplifier 82.

Assume as an example that the voltage at the positive input of amplifier 82 is driven more positive than the reference voltage at the negative input of amplifier 82. The voltage at the output of amplifier 82 will therefore be driven positively with respect to the fixed reference voltage at the negative input of amplifier 82 and will be at least closely proportional to the difference between the voltages at the positive and negative inputs of the amplifier. This corrective change in the voltage at the output of amplifier 82 drives the voltages at the bases of transistors Q1 and Q2 more positive by equal amounts.

Since transistors Q1 and Q2 are of opposite polarity, transistor Q1 will be forced to conduct less and transistor Q2 will be forced to conduct more to an extent needed to drive the voltage at the positive input of amplifier 82 to the fixed reference voltage (i.e., the midpoint of the voltage supply in this embodiment). Upon stabilizing, the corrective action of feedback 80 will be such that the collector-emitter voltages of transistors Q1 and Q2 will become equal or at least closely equal to each other, and the voltage applied to the positive input of amplifier 82 will closely approach the fixed reference voltage at the amplifier's negative input.

An incoming, single-ended audio signal imposed on the receive port 26 will be coupled to the base of transistor Q1, causing the transistor's base voltage to change from that value which is needed to maintain the voltage at junction 65 equal to the fixed reference voltage or midpoint of the voltage supply. The emitter current drawn by transistor Q1 will therefore attempt or tend to change in a direction depending upon the direction in which the transistor's base voltage is changed to cause the transistor's collector voltage to begin the change.

If, for example, the audio signal voltage applied to the base of the transistor Q1 is negative going with respect to the existing quiescent voltage level, then the voltage on the collector of transistor Q1 will begin to become more positive. When this happens the voltage on the collector of transistor Q2 will initially follow the voltage on the collector of transistor Q1 since the collector-emitter current drawn by transistor Q2 will not change significantly at this stage of operation.

Thus, the voltage at the non-inverting input of amplifier 82 will follow the positive increase in the voltage on the collector of transistor Q1. The voltage at the output of amplifier 82 will therefore increase in a positive direction by a magnitude proportional to the difference between the fixed reference voltage at the amplifier's negative input terminal and the voltage at the amplifier's positive input terminal.

This positive going increase in the voltage at the output of amplifier 82 is coupled back to the bases of transistors Q1 and Q2, making the base voltages for transistors Q1 and Q2 more positive by equal amounts. The positive going voltage increase at the base of transistor Q1 reduces the conductivity of Q1 and causes partial cancellation of the negative going audio signal voltage at the base of transistor Q1.

The positive going increase in the voltage on the base of transistor Q2 increases the collector-emitter current drawn by transistor Q2 by an amount closely proportional to the voltage increase at the output of amplifier 82. This increase in collector-emitter current for transistor Q2 enables the collector-emitter current drawn by transistor Q1 to increase by a corresponding amount. The result is that the collector voltage of transistor Q2 will become more negative and the collector voltage of transistor Q1 will become more positive by equal amounts to establish the balanced differential audio signal for application to the bidirectional port 22.

If, for example, the collector voltage for transistor Q2 becomes more negative by one volt, then the collector voltage for transistor Q1 will become more positive by one volt. The equal but opposite going changes in the voltages on the collectors of transistors Q1 and Q2 cause the voltage at junction 65 and hence at the non-inverting input of transistor 82 to return to or closely approach the reference voltage which in this case is the midpoint of the voltage supply 51.

For an incoming single-ended audio signal voltage that is positive going transistors Q1 and Q2 and feedback 80 will have the opposite effect of the situation just described for a negative going single-ended audio signal. For the positive going incoming signal the collector-emitter current of transistor Q1 tends to reduce, causing the voltage on the collector of transistor Q1 to begin to change negatively. As before, the voltage on the collector of transistor Q2 will initially follow the voltage on the collector of transistor Q1 before correction is effected by feedback 80. The voltage at the non-inverting input of amplifier 82 will therefore become more negative than the midpoint reference voltage at the amplifier's negative input. As a result, the voltage at the output of amplifier 82 will be driven in a negative going direction, thereby increasing the conductivity of transistor Q1 while decreasing the conductivity of transistor Q2.

Decreasing the conductivity of transistor Q2 decreases the collector-emitter current drawn by transistor Q2 and hence decreases the collector-emitter current drawn by transistor Q1. In response to a positive going single-ended audio signal, therefore, the collector voltage of transistor Q1 will become more negative and the collector voltage of transistor Q2 will become more positive, and the changes in the two collector voltages will be equal but in opposite directions.

From the foregoing description it will be appreciated that feedback 80 cooperates with transistors Q1 and Q2 to develop the balanced differential audio signal voltage across the collectors of transistors Q1 and Q2. Ignoring the voltage drops across diodes 58 and 62 the tip signal voltage on tip conductor 46 will be the collector voltage of transistor Q1 and the ring signal voltage on ring conductor 47 will be the collector voltage of transistor Q2. Like the collector voltages of transistors Q1 and Q2, the tip and ring signal voltages will be opposite in phase with respect to each other to thus establish the balanced differential signal on line 34 for application to telephone 48.

It will also be appreciated that the voltage at the output of amplifier 82 will be proportional to the voltage difference across the collectors or transistors Q1 and Q2 and hence across the tip and ring conductors 46 and 47 of the two-wire line 34. The voltage at the output of amplifier 82 is therefore proportional to the differential signal voltage. This voltage, as will be described in detail shortly, is applied as a cancellation voltage to prevent the incoming single-ended audio signal which is received at port 26, from being returned to the transmit section of the four-wire circuit by way of transmit port 30.

In addition to the previously mentioned functions, circuit 50 also operates to cancel any longitudinal voltages which may be impressed upon the tip and ring conductors 46 and 47 of the two-wire line 34 without affecting the tip and ring audio signals making up the desired differential signal. The longitudinal voltages or currents appearing on conductors 46 and 47 are distinguished from the tip and ring audio signals in that they are in phase and hence of the same polarity rather than being of the opposite polarity. In other words the two longitudinal voltages appearing on the top and ring conductors, respectively, will both go positive at the same time or will both go negative at the same time. Quite often induced 60 Hz longitudinal currents or voltages are impressed upon the conductors of line 34 in situations where line 34 is in the proximity of a power line. Such an a.c. longitudinal voltage condition is frequently referred to as 60 Hz pickup.

If longitudinal voltages are impressed upon the tip and ring conductors of line 34 the voltages on the tip and ring conductors will momentarily change or begin to change in the same direction and usually by the same amount. For example, if the longitudinal voltages impressed upon conductors 46 and 47 are positive going then the summation of voltages on each of the conductors 46 and 47 will cause the voltage at the non-inverting input of amplifier 82 to become more positive than the reference voltage. When this happens the voltage at the output of amplifier 82 becomes more positive by an amount proportional to the longitudinal voltages, thus causing transistor Q2 to conduct more and transistor Q1 to conduct less.

The amount of collector current drawn by transistor Q2 will therefore increase to cancel the longitudinal current on the ring lead 47. At the same time the collector current drawn by transistor Q1 will decrease to cancel the longitudinal current on the tip lead 46.

If the longitudinal voltages on the tip and ring conductors 46 and 47 are negative going, rather than positive going, the voltage at the non-inverting input of amplifier 82 will become more negative than the referencing midpoint of voltage supply 51. This causes transistor Q1 to conduct more and transistor Q2 to conduct less. Transistor Q1 will therefore draw more collector current while transistor Q2 will draw less collector current, thereby cancelling the unwanted longitudinal signals.

From the foregoing description it will be appreciated that in absence of any longitudinal voltages on the tip and ring conductors 46 and 47, transistors Q1 and Q2 will be maintained in balance by feedback 80 such that both transistors draw equal or substantially equal collector currents to make the collector-emitter voltages of the two transistors equal to each other. However, when longitudinal voltages appear on the conductors of the two-wire line 34 the collector currents for transistors Q1 and Q2 will change in opposite directions, thus causing the collector voltages of the two transistors to attempt to change in the direction opposite to the impressed longitudinal voltages. Circuit 50 therefore establishes an effective zero impedance from the tip and ring conductors to ground for longitudinal voltages (i.e., voltages of the same polarity), but not for the audio voltages of opposite polarity.

The audio signal transmitted from the telephone handset 48 will appear as 180° out-of-phase audio voltages on the tip and ring conductors 46 and 47, respectively. The audio signal on the tip conductor 46 is coupled through diode 58, a d.c. blocking capacitor 90 and an amplifier input resistor 92 to the negative input of a differential amplifier 94. The audio signal on the ring conductor 47 is coupled through diode 62, a d.c. blocking capacitor 96 and an input resistor 98 to the positive input of amplifier 94. By these connections it will be appreciated that amplifier 94 is differentially coupled to the two-wire port 22 and hence to the two-wire line 34.

The output of amplifier 94 is fed through an output resistor 102 to the ungrounded terminal 31 of transmit port 30. A local feedback for amplifier 94 comprises a resistor 100 connected between the amplifier's negative or inverting input and the amplifier's output terminal as shown.

In the illustrated embodiment amplifier 94 is an operational amplifier configuration in which the voltage gain for the ring signal between the amplifier's non-inverting input and the amplifier's output is not the same as the voltage gain for the tip signal between the amplifier's inverting input and the amplifier's output, the former being one plus the quotient of the feedback resistance (resistor 100) divided by the input resistor (resistor 92), and the latter being simply the quotient of the feedback resistance (resistor 100) divided by the input resistance (resistor 92). To compensate for this gain difference a further resistor 104 is connected between the non-inverting input of amplifier 94 and earth ground to establish a voltage divider with resistor 98. The divider established by resistors 98 and 104 divides down the ring signal voltage and thereby has the effect of attenuating the ring signal. With this circuit design, appropriate selection of resistance values for resistors 92, 98 and 104 equalizes the voltage gains for the tip and ring signals.

Being of the differential type, amplifier 94 will only amplify difference between the input voltages at its inverting and non-inverting terminals, respectively. Amplifier 94 therefore responds to the incoming tip and ring signal voltages since they are 180° out-of-phase with each other. The voltage at the output of amplifier 94 will be equal or proportional to the sum of the absolute magnitudes of the applied tip and ring signal voltages. Amplifier 94 thus has the effect of converting the differential audio signal which is transmitted from telephone 48 into a single-ended drive for transmit port 30.

Because amplifier 94 is differentially coupled to the two-wire line it will be insensitive to longitudinal and other in-phase currents to thereby provide effective longitudinal rejection. More specifically, in-phase longitudinal currents or voltages, being of the same polarity, will not result in any voltage change at the output of amplifier 94 and consequently will not be applied to the transmit port 30 for conduction to transmitter 42.

Since most if not all of the longitudinal voltages appearing on the tip and ring conductors 46 and 47 are cancelled by feedback 80, a precise balance at the input of amplifier 94 is not required to achieve common mode or longitudinal rejection. As a result, the input circuitry for amplifier 94 may be simplified as shown.

From the foregoing it will be appreciated that two differential signals are applied to the two-wire line 34, one being for transmission from port 22 to telephone 48 and the other being for transmission from telephone 48 to port 22. In the following description the differential signal which is applied for transmission from port 22 to telephone 48 and which is developed by the incoming single-ended signal is identified as the outgoing differential signal. The other differential signal which is transmitted from telephone 48 to port 22 is identified as the incoming differential signal.

Since the input terminals of amplifier 94 are coupled to the collectors of transistors Q1 and Q2, the outgoing differential signal, which is developed by application of a single-ended audio signal at the base of transistor Q1, will be applied to amplifier 94 as well as to line 34. Amplifier 94 therefore develops an output signal voltage component proportional to the outgoing differential signal. The voltage developed at the output of amplifier 82, however, is used to cancel the differential amplifier output voltage which results from the outgoing differential signal, thereby preventing incoming signals received at port 26 and converted into a differential signal from being coupled into transmitter 42.

The foregoing voltage cancellation is accomplished by connecting the output of amplifier 82 through a capacitor 110 and a resistor 112 to terminal 31 of transmit port 30. The voltage at the output of amplifier 82 is therefore coupled through capacitor 110 and resistor 112 to terminal 31. Terminal 31 is established as a current summing point or node by being connected to the input of a summing amplifier such as the amplifier used in compressor 49.

From the previous description it will be recalled that for a given terminating impedance 75 and telephone set impedance, the signal voltage at the output of amplifier 82 will be proportional to the differential signal voltage which is established across the tip and ring conductors 46 and 47 by the incoming single-ended signal voltage. Furthermore, the signal voltage at the output of amplifier 82 will be at least approximately opposite in phase with respect to the voltage component developed at the output of differential amplifier 94 in response to the outgoing differential signal voltage. Resistor 112 is sized to make the cancelling current which is applied by amplifier 82 to terminal 31 closely equal in absolute magnitude to the differential amplifier output signal current which is developed at terminal 31 by the outgoing differential signal voltage (i.e., the differential signal which is produced by the incoming single-ended signal at port 26).

Capacitor 110, resistor 102, resistor 112 and two additional capacitors 113 and 115 combine to form a phase adjusting network. Capacitors 110 and 115 adjust the phase of current through resistor 112. Capacitor 113 adjusts the phase of current through resistor 102. The current phase adjustments are such that the cancelling voltage at terminal 31 is at least closely 180° out-of-phase with respect to the differential amplifier output voltage to be cancelled even though the impedance of the telephone and various lengths of drop cable change considerably with frequency. Effective cancellation of the undesired differential amplifier output voltage component which results from the outgoing differential signal is therefore achieved at transmit port 30 to prevent the undesired signal from being returned through the transmit portion of the four-wire line that is connected to hybrid 20.

From the preceding description it will be noted that amplifier 82 does not respond to the incoming differential signal which originate at telephone 48, but instead responds to the change that is brought about by the application of the single-ended audio signal to the base of transistor Q1. In this regard it will be observed that neither of the incoming or outgoing differential signals alone will cause the voltage at the non-inverting input of amplifier 82 to change because the tip and ring signal voltages making up each differential signal will be equal in absolute magnitude and 180° out-of-phase with respect to each other.

Accordingly, the cancelling voltage developed by amplifier 82 at terminal 31 will not be dependent on and will not be changed by the incoming tip and ring signals which originate at telephone 48 and which are fed to amplifier 94 by way of line 34. Thus, the cancelling voltage supplied by amplifier 82 will not cancel the signal voltage that is developed at the output of amplifier 94 by the tip and ring signals which are fed to amplifier 94 from telephone 48. Audio signals originating at telephone 48 will therefore be fed to transmitter 42 by way of the transmit port 30.

It will be noted that the differential signal which is produced as a result of the application of the incoming single-ended signal to the base of transistor Q1 will vary as a function of and hence depend upon the value of the impedance 75 and the value of the off-hook impedance established by telephone 48 across the tip and ring conductors as well as being a function of the level of the incoming single-ended signal. The output voltage developed by the differential amplifier 94 in response to this outgoing differential signal will be a corresponding function of the same factors. It therefore is preferable to use the output of amplifier 82 as the cancelling voltage rather than using the incoming single-ended signal directly.

With the hybrid circuit of this invention loop current supervision for the two-wire line 34 is readily accomplished by the addition of a transistor Q3 as shown in FIG. 1. The emitter of transistor Q2 feeds the base of transistor Q3 through a base resistor 120. A capacitor connected between the base of transistor Q3 and the negative terminal 52 of the voltage supply 51 maintains the base of transistor Q3 at a.c. ground. The emitter of transistor Q3 is connected directly to the voltage supply's negative terminal 52. The output is taken from the collector of transistor Q3. In this embodiment transistor Q3 is of the PNP type.

When the telephone set 48 is on-hook to open hook switch 68, only a small amount of direct current will flow through the series connected transistors Q1 and Q2 and through resistor 64 with the result that a relatively small voltage drop will occur across resistor 64, making the voltage at the base of transistor Q3 sufficiently negative to turn off the transistor. When telephone 48 is brought off-hook to close hook switch 68 the telephone set establishes a relatively low bypassing impedance around resistors 60 and 61.

As a result, a relatively large direct current flows through the two-wire line or loop 34 and through resistor 64 to thereby increase the voltage drop across resistor 64. This makes the voltage at the base of transistor Q3 much less negative to a sufficient extent to turn on the transistor. In this manner, transistor Q3 monitors the loop current (i.e., direct current) in the two-wire line 34. For carrier system operation the on-off operation of transistor Q3 may be used for supplying dialing information and on and off hook information back to the central office.

Diodes 58 and 62 and two additional diodes 126 and 127 provide protection against transients due to lightening and the like. Zener diodes 126 and 128 prevent the voltages at the inverting and non-inverting input terminals of amplifier 94 from exceeding a predetermined or pre-selected level. A further zener diode 128 prevents the voltage at the non-inverting input of amplifier 82 from exceeding a predetermined level.

Figure 2:
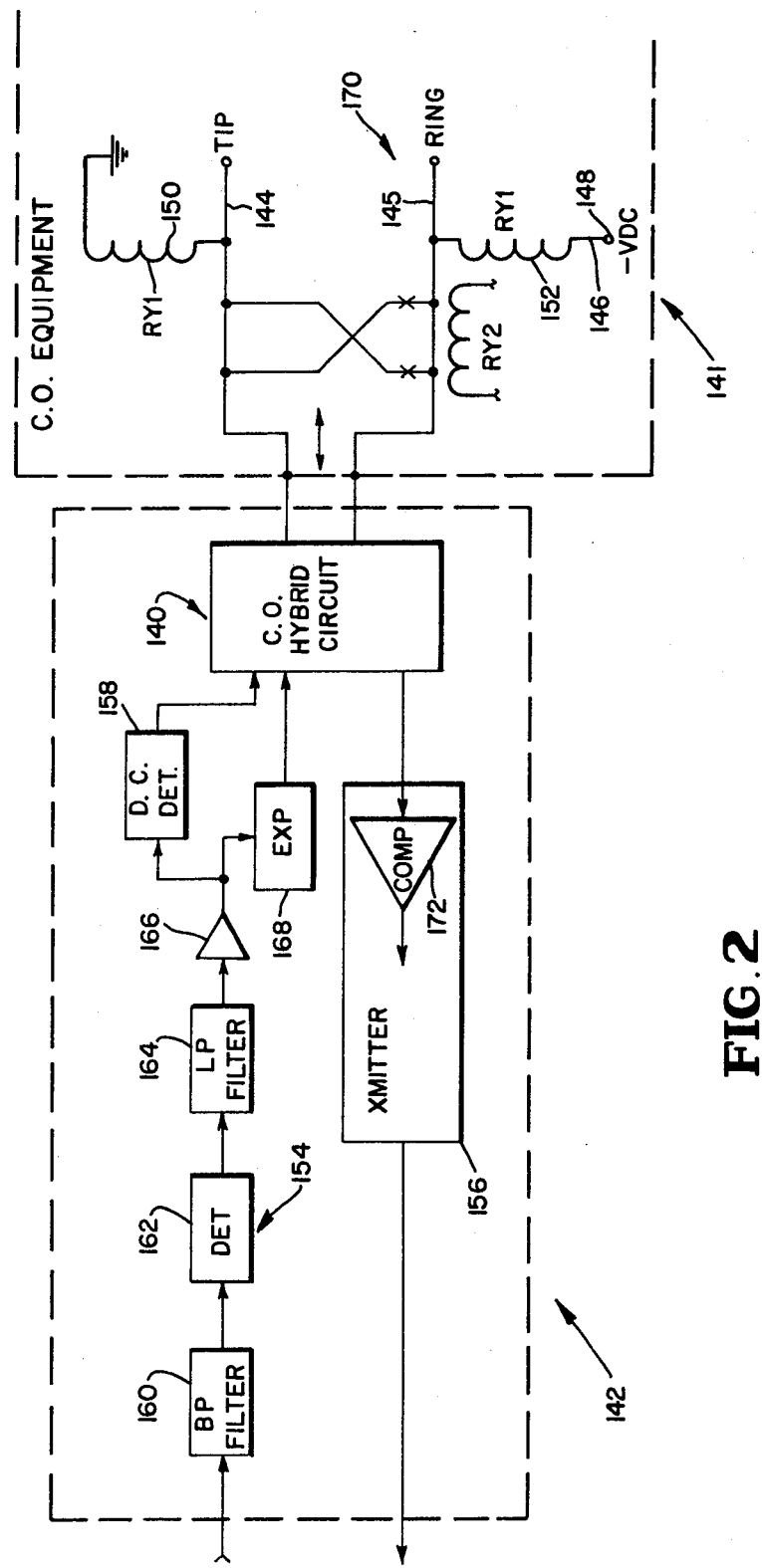
FIG. 2 is a schematic block diagram of a second embodiment of the invention adapted for use with central office equipment, particularly as an interface between a central office drop and a four-wire central office carrier channel.
Figure 3:
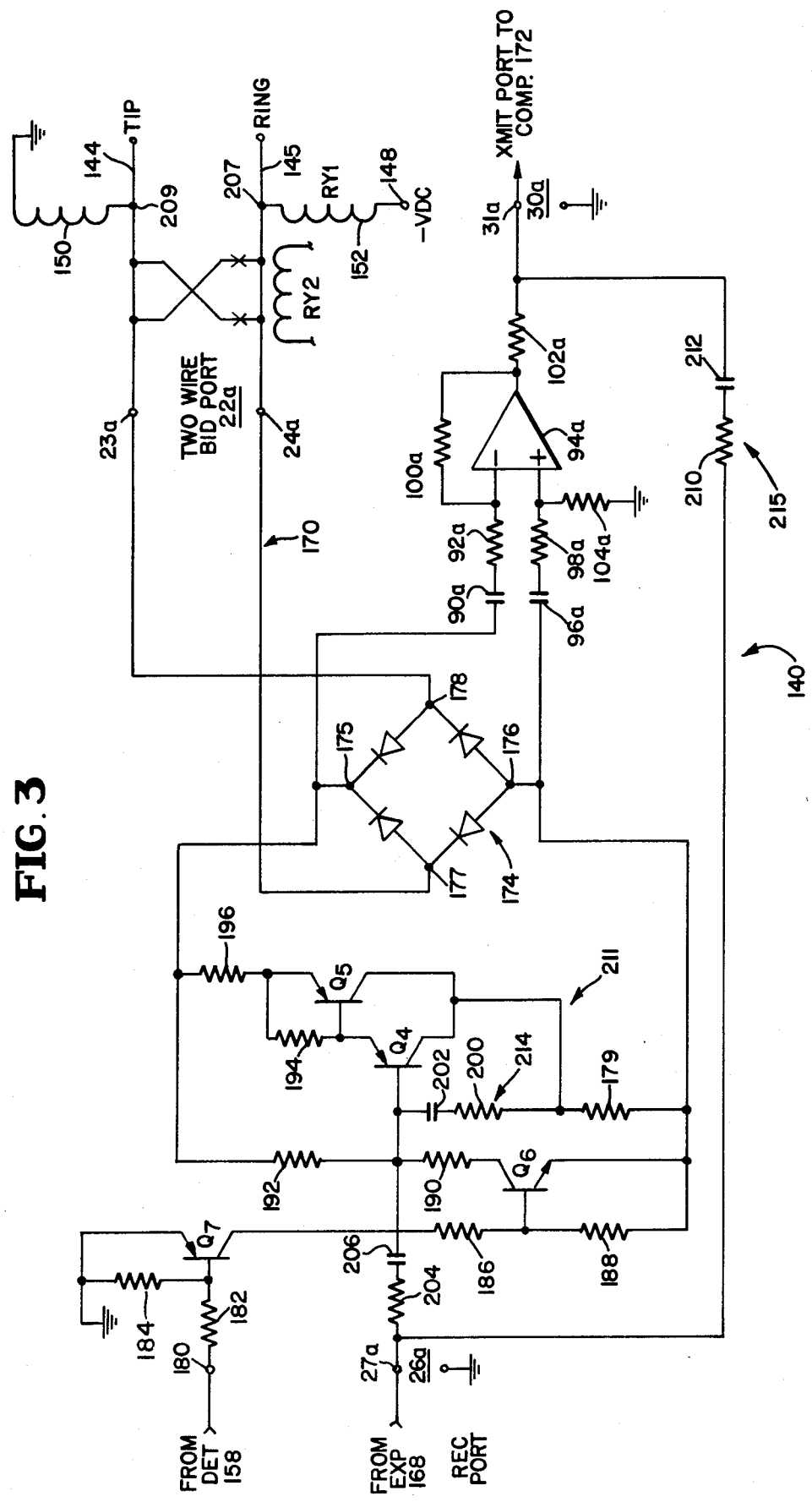
FIG. 3 is a schematic circuit diagram of the central office transformerless hybrid circuit shown in FIG. 2.

A second embodiment of a transformerless or solid state hybrid circuit incorporating principles of this invention is shown in FIG. 3 and is particularly designed or adopted for use at a central office as a signal interface between the central office equipment and the four-wire circuit of a central office carrier channel. This central office hybrid is generally indicated at 140 in FIGS. 2 and 3.

In FIG. 2 the central office equipment is generally indicated at 141. The central office subscriber carrier channel mentioned above comprises a central office terminal circuit 142 and may be the same as the one shown in the previously mentioned U.S. Pat. No. 4,087,639.

Like the transformerless hybrid shown in FIG. 1 the central office hybrid circuit 140 is also provided with a single-ended receive port, a single-ended transmission port, and a bidirectional transmission port. In addition, hybrid circuit 140 incorporates a differential amplifier circuit similar to the differential amplifier 94 in FIG. 1. To the extent that the hybrid circuits shown in FIGS. 1 and 3 are alike, like reference numerals have been applied to designate corresponding parts, except that the reference numerals used for circuit 140 have been suffixed by the letter a to distinguish them from the reference numerals used in the embodiment of FIG. 1.

The central office equipment 141 referred to above comprises the usual tip and ring conductors 144 and 145, respectively, and a central office battery 146 having a negative terminal 148 and a grounded positive terminal. In addition, the central office equipment typically includes a line relay RY1. The central office may also be equipped with a polarity reversing relay RY2.

Relay RY1 has a pair of coils or windings 150 and 152, one being connected between the tip lead or conductor 144 and ground and the other being connected between the ring lead or conductor 145 and the negative terminal of the central office battery 146. Relay RY2 is used to operate polarity reversing contacts to reverse the flow of battery current through the coils of relay RY1. This conventional central office equipment is also shown in the previously mentioned U.S. Pat. No. 4,004,109.

The central office terminal circuit 142 is basically the same as the subscriber terminal circuit 36 and comprises the usual communication receiver 154 and communication transmitter 156. In addition to the usual detecting and filtering equipment, receiver 154 also includes a detector 158 for detecting or sensing the presence of the d.c. component that is developed by detecting an incoming carrier signal and filtering the detected carrier signal. The output of detector 158 is fed to hybrid circuit for causing a device or component in the hybrid circuit to repeat the hook-state and dial-breaks as will be described in detail later on.

In the illustrated embodiment, receiver 154 may comprise a bandpass filter 160 for passing a carrier signal of pre-selected frequency, a carrier signal detector 162 for detecting the carrier signal passed by filter 160, a low pass filter 164 for passing the audio signal recovered by the detection of the received carrier signal and for smoothing the rectified carrier signal component to develop the d.c. component mentioned above, an AGC amplifier for amplifying the signal components supplied at the output of filter 164, and an expandor 168 for expanding the recovered and amplified audio signal. As previously noted the audio signal output of expandor 168 is usually single-ended as shown and is connected to the receive port terminal 27a to impose the incoming single-ended audio signal on receive port 26a.

As will be described in detail later on hybrid circuit 140 converts this incoming, single-ended audio signal into a balanced differential signal for application as an outgoing signal to the bidirectional port 22a. The ring and tip conductors 144 and 145 establish a two-wire line 170 and are respectively connected to the terminals 23a and 24a of the bidirectional port 22a. Line 170 is connected to central office equipment for transmitting the outgoing differential signal from port 22a. Line 170 also couples the incoming differential signal coming in from the central office equipment 141 to port 22a for transmission to the hybrid circuit's transmit port 30a.

Transmit port 30a may be coupled to a compressor 172 in transmitter 156. Transmitter 156 is equipped to modulate an outgoing carrier signal with the audio signal that is fed to the transmitter from the transmit port 30a.

Referring to FIG. 3, hybrid circuit 140 mainly comprises a pair of bipolar transistors Q4 and Q5 connected to a Darlington configuration or circuit, a bipolar switching transistor Q6 for the transistor Darlington circuit mentioned above, a further bipolar switching transistor Q7 for transistor Q6, a diode bridge 174 and an a.c. signal source resistance 179.

The terminals of diode bridge 174 are indicated at 175, 176, 177 and 178. Terminals 177 and 178 are respectively connected to the terminals 23a and 24a of the two-wire port 22a and hence to the tip and ring conductors 144 and 145. The voltage polarities at terminals 177 and 178 are switchable by operation of relay RY2. Diode bridge 174 serves to maintain a fixed predetermined polarity across terminals 175 and 176 even though the polarities at terminals 177 and 178 and switched.

The output of the d.c. component-sensing detector 158 in receiver 154 is connected to a terminal 80 of hybrid circuit 140 and is coupled to the base of transistor Q7 by way of a resistor 182. Detector 158 may be of any suitable circuit design and may comprise a bipolar transistor (not shown) which is turned on by the d.c. component that is developed by the detection and filtering of the received carrier signal in receiver 154. The collector of this unshown bipolar transistor may be taken as the output of the detector 158 for connection to terminal 180.

In a typical design of a subscriber or station carrier system, the subscriber carrier channel, such as the subscriber terminal circuit 36 in FIG. 1, will transmit its carrier signal only when the subscriber's telephone 48 is brought off-hook to close the hook switch 68. When the subscriber's telephone 48 is in its on-hook state to open hook switch 68 the carrier signal will not be transmitted from the subscriber carrier channel. This carrier signal upon being transmitted from the subscriber carrier channel will be fed by way of an unshown two-wire transmission line to a central office carrier channel such as the central office terminal circuit 142. Accordingly, the reception or lack of reception of the carrier signal at receiver 154 is indicative of the hook state of telephone 48. Additionally, the transmission of the carrier signal mentioned above will be interrupted by each telephone dial break. In this manner, dialing information is transmitted to the central office.

When the carrier signal is received by receiver 154, detector 158 responds to the resulting d.c. component by turning transistor Q7 on. When the carrier signal is interrupted or not received, the above-mentioned d.c. component will be absent and transistor Q7 will be turned off.

Transistor Q7 therefore repeats the hook-state and dial break information. More specifically, transistor Q7 will be turned on when telephone 48 is brought off-hook and will momentarily be turned off by each dial break that is established by dialing a number at telephone 48. When telephone 48 is returned to its on-hook state transistor Q7 will be turned off.

As shown, the voltage applied at terminal 180 for turning transistor Q7 on is divided down by the voltage divider action of resistor 182 and a further resistor 184.

The emitter of transistor Q7 is connected to ground, and the collector of transistor Q7 is coupled through a pair of series connected voltage-dividing resistors 186 and 188 to terminal 176 of diode bridge 174. The base of transistor Q6 is connected to the junction between resistors 186 and 188. With these circuit connections it will be appreciated that when transistor Q7 turns on it causes collector current to flow through resistors 186 and 188 to establish the forward biasing voltage for turning transistor Q6 on. When transistor Q7 is turned off no collector current will flow through resistors 186 and 188. As a result, transistor Q6 will be turned off when transistor Q7 is turned off.

With continued reference to FIG. 3, the emitter of transistor Q6 is connected to the diode bridge terminal 176, and the collector of transistor Q6 is connected through a pair of series connected voltage dividing resistors 190 and 192 to the diode bridge terminal 175. The base of the input transistor Q4 in the Darlington configuration is connected to the junction between resistors 190 and 192. When transistor Q6 is turned on to cause collector current to flow through resistors 190 and 192 a base biasing voltage is established to turn on transistor Q4. When transistor Q6 is turned off transistor Q4 will also be turned off or non-conducting.

As shown, the emitter of transistor Q4 is connected through emitter resistors 194 and 196 to the diode bridge terminal 175. The emitter of transistor Q5 is also connected to diode bridge terminal 175 through resistor 196. The collectors of transistors Q4 and Q6 are directly d.c. coupled together and are connected through the source resistance 179 to the diode bridge terminal 176.

Still referring to FIG. 3, the base of transistor Q5 is directly d.c. coupled to the emitter of transistor Q4 so that when transistor Q4 turns on, transistor Q5 will also conduct. When transistors Q4 and Q5 are turned on, collector current will flow through the source resistance 179.

Battery 146 furnishes the collector-emitter currents for transistors Q4–Q7 by way of diode bridge 174. Since transistors Q4–Q7 are connected to the side of bridge 174 that does not change in polarity, the collector supply voltages for the transistors will not change even though a battery reversal occurs by operation of relay RY2 to switch the polarities at the tip and ring conductors 144 and 145 on the other side of the diode bridge.

From the foregoing it will be appreciated that when no carrier signal is received by receiver 154 transistors Q4–Q7 will be turned off. When the carrier signal is received and detected, however, transistors Q4–Q7 will be turned on in the manner explained above.

A negative a.c. feedback is provided for the Darlington pair of transistors Q4 and Q5 by connecting the mutually coupled collectors of transistors Q4 and Q5 serially through a resistor 200 and a d.c. blocking capacitor 202 to the base of transistor Q4. The input terminal 27a of receive port 26a is connected by way of a resistor 204 and a coupling capacitor 206 to the base of transistor Q4 to couple the audio signal at the output of expandor 168 to the base of transistor Q4.

Upon turning on, the Darlington transistor pair Q4, Q5 completes a circuit for conducting loop current (i.e., battery current) through the tip and ring conductors 144 and 145. With negative polarity on the ring conductor 145 this circuit may be traced from the grounded battery terminal through the relay coil 150, through the tip conductor 144, through the diode bridge terminals 178 and 177, through the emitter-collector electrodes of transistors Q4 and Q5, through the signal source resistance 179, through the diode bridge 176 and 177, through the ring conductor 145 and through the relay coil 152 to the negative battery terminal 148.

The relay RY2 is operated to cause a battery reversal the flow of current through the tip and ring conductors 144 and 145 will reverse, but the current flow through transistors Q4 and Q5 and the source resistance 179 will remain the same because of diode bridge 174. The loop current supplied by turning transistors Q4 and Q5 on is used to operate the central office relay equipment as is well known in the art.

If an audio or other a.c. signal has been applied to modulate the carrier signal that is received by receiver 154, it will be recovered and separated from the other components of detection and fed by way of expandor 168 to the base of transistor Q4. The a.c. signal applied to the base of transistor Q4 causes transistors Q4 and Q5 to vary in conduction.

Since transistors Q4 and Q5 are of the same type (i.e., the PNP type in this embodiment) the positive going alternations of the incoming audio signal will cause both of the transistors Q4 and Q5 to conduct less and the negative going alternations of the incoming audio signal will cause both of the transistors Q4 and Q5 to conduct more. The collector-emitter voltages of transistors Q4 and Q5 will therefore vary in a corresponding manner. Varying the collector-emitter voltages for transistors Q4 and Q5 causes a related but opposite going change in the voltage drop across the source resistance 179 since the voltage across the diode bridge terminals 175 and 176 is set by the central office battery 146. Varying the voltage across the source resistance 179 varies the magnitude of the current flowing through the source resistance.

The current flowing through the source is the same current that also flows in the tip and ring conductors 144 and 145. Thus, an increase in current flowing through the source resistance 179 results in an increase in current flowing through both of the tip and ring conductors 144 and 145. The same current increase will therefore occur in the current flowing through the relay coils 150 and 152 or any other central office load that may be placed across the tip and ring conductors 144 and 145 by the central office switching equipment.

The relay coils 150 and 152 are customarily balanced and therefore have equal impedances. An increase in the current flowing in the tip and ring conductors 144 and 145 and hence in the current flowing through the relay coils 150 and 152 themselves therefore increases the voltages drop across the relay coils by equal amounts. Accordingly, the ring voltage at junction 207 (see FIG. 3) will become more positive while the tip voltage at junction 209 becomes more negative. The resulting absolute changes in the tip and ring voltages mentioned above will be equal.

For positive going alternations of the incoming a.c. or audio signal at the base of transistor Q4 the Darlington transistor pair Q4 and Q5 will conduct less, reducing the flow of current through the source resistance 179 and hence through the tip and ring conductors 144 and 145 as well as the relay coils 150 and 152. The voltages dropped across the relay coils 150 and 152 will therefore decrease by equal amounts, causing the ring voltage at junction 207 to become more negative and causing the tip voltage at junction 209 to become less negative or to change in a positive direction. The voltage at junction 209 therefore becomes less negative by the amount that the voltage at junction 207 becomes more negative.

From the foregoing it will be appreciated that the circuit comprising transistors Q4 and Q5 converts the incoming single-ended signal, which is received at port 26a, into a balanced differential signal for application to port 22a and hence to the tip and ring conductors 144 and 145. This converting circuit is generally indicated at 211 in FIG. 3.

It also will be appreciated that the tip and ring signal voltages at junctions 209 and 207, respectively, will be opposite in phase but equal in absolute magnitude. Additionally, the Darlington circuit comprising the transistor pair Q4 and Q5 operates under the control of the switching transistors Q6 and Q7 to provide the battery feed for the tip and ring conductors 144 and 145 in response to the reception of a carrier signal or some other signalling means.

The negative a.c. feedback network defined by resistor 200 and capacitor 202 is generally indicated at 214 in the drawings and establishes a negative feedback voltage which only partially cancels the incoming a.c. or audio signal that is applied by way of receive port 26a to the base of transistor Q4. This negative feedback lowers or reduces the output Darlington circuit impedance (i.e., the impedance seen at the collectors of transistors Q4 and Q5) to a very low value (e.g., 10 to 20 ohms), thus making the Darlington configuration of transistors Q4 and Q5 a voltage source rather than a current source. The feedback established by network 214 holds the collector voltage of the Darlington pair Q4, Q5 at some constant pre-selected value with respect to ground.

The low output impedance of the Darlington transistor pair Q4, Q5 is particularly important since it makes up part of the overall a.c. signal source impedance with the signal source resistance 179. The overall a.c. signal source impedance must be set to a fixed relatively low value that matches or at least closely matches the central office load impedance which is connected by the central office equipment across the tip and ring conductors 144 and 145. This central office load impedance is typically 910 ohms. Matching the 910 ohms load of the central office equipment provides a balanced hybrid condition with the central office trunk to assure proper operation of the central office equipment and to attain maximum power transfer.

Because of the low output impedance at the collectors of transistors Q4 and Q5, the overall a.c. signal source impedance will mainly be determined by the fixed value of the signal source resistance 179. The overall a.c. signal source impedance will therefore remain substantially constant and will not be varied to any significant degree by the audio signal at the base of transistor Q4. A close match between the signal source impedance and the central office load impedance is therefore established regardless of variations in the signal current.

It will be noted that diode bridge 174 does not rectify the current that is looped through the diode bridge. The value of this current, however, changes depending upon the drop across resistance 179, and the voltage drop across resistance 179 is determined by the variation of the collector-emitter voltage for the Darlington transistor pair Q4 and Q5.

The audio signal transmitted from the central office equipment to the bidirectional port 22a will appear as 180° out-of-phase audio voltages on the tip and ring conductors 144 and 145, respectively. For negative battery polarity on the ring conductor 145, the audio signal on the tip conductor 144 will be coupled through the diode bridge, capacitor 90a and resistor 92a to the inverting input of the differential amplifier 94a. The ring signal on ring conductor 145 will be coupled by way of the diode bridge, capacitor 96a and resistor 98a to the non-inverting input of amplifier 94a.

The differential amplifier circuit connection for capacitors 90a and 96a and resistors 92a, 98a, 100a, 102a and 104a all the same as that previously described for the embodiment shown in FIG. 1. Accordingly, the tip and ring signals making up the differential signal that is fed into port 22a from the central office equipment will be applied to the inverting and non-inverting inputs of amplifier 94a. Amplifier 94a responds to this differential input to establish an output signal voltage that is proportional to the sum of the absolute magnitude of the tip and ring signal voltages. The incoming differential signal that is received at port 22a is therefore converted by amplifier 94a into an outgoing single-ended signal which is applied for transmission to transmit port 30a. Additionally, amplifier 94a provides common mode or longitudinal rejection in the manner previously described.

As shown, the inverting and non-inverting inputs of the differential amplifier 94a are coupled to the diode bridge terminal 175 and 176. The Darlington circuit containing transistors Q4 and Q5 and the source resistance 179 are connected in series across the same diode bridge terminals, namely terminals 175 and 176. The balanced differential signal developed by circuit 211 in response to an incoming single-ended signal will therefore be applied across terminals 175 and 176 and hence to the input of amplifier 94a for amplification.

Amplifier 94a will therefore develop two output signal voltage components, one being desired and the other being undesired. The undesired component is developed in response to the outgoing differential signal (i.e., the differential signal that is developed by circuit 211 and applied to port 22a for application to the central office equipment), and the desired signal component is developed in response to the incoming differential signal (i.e., the signal which is fed from the central office equipment to the bidirectional port 22a for conversion and application as a transmit signal to port 30a).

The undesired signal voltage component at the output of amplifier 94a is cancelled by connecting a voltage cancelling network 215 between the input terminal 28a and the output terminal 31a and by establishing terminal 31a as a current summing point or node as by connecting terminal 31a to the input of a summing amplifier such as the amplifier used in compressor 172. Alternatively, a separate summing amplifier (not shown) may be interposed between resistor 102a and the output terminal 31a. In such an alternate arrangement network 215 and the output of amplifier 94a will be connected to the summing input of the unshown summing amplifier.

In the illustrated embodiment the cancelling network 215 comprises a resistor 210 and a capacitor 212 connected in series between terminal 27a and 31a. By these connections network 215 feeds the single-ended audio signal at the output of expandor 168 to terminal 31a for cancelling the signal voltage component that is developed at the output of amplifier 94a by the outgoing differential signal (i.e., the differential signal developed by or in response to the input single-ended signal which is fed from expander 168 to receive port 26a). The cancelling signal voltage at terminal 31a will be opposite in phase with respect to the undesired signal component and will be set to be closely matched in magnitude to this undesired signal voltage component by the size of resistor 210.

From the foregoing description it will be noted that when the tip conductor 144 is at ground and the ring conductor is at the negative battery polarity (e.g., −48 VDC) an increase in the signal current through the tip and ring conductors 144 and 145 causes the voltage at junction 209 to become more negative and the voltage at junction 207 to become more positive (more specifically, less negative). When a battery reversal occurs to place the negative battery potential on the tip conductor 144 and ground on the ring conductor 145, then an increase in the signal current through the tip and ring conductors 144 and 145 causes the voltage at junction 209 to become more positive and the voltage at junction 207 to become more negative. The polarity of the a.c. signal across the tip and ring conductors will therefore change relative to the polarity of the a.c. signal at the output of expandor 168 when a battery reversal takes place.

However, the polarity of the differential signal developed by the circuit 211 from the received single-ended signal and impressed across the diode bridge terminals 175 and 176 will not change. Network 215 is therefore effective to furnish the proper polarity of cancellation voltage even though battery reversal takes place to reverse the polarity on the tip and ring conductors 144 and 145.

By causing the transistor pair Q4, Q5 to turn on when a carrier signal is received and detected in receiver 154 and to turn off when the carrier signal is not received, it will be appreciated that the transistor pair Q4, Q5 repeats the hook state and dialing breaks established at the telephone (48) that is served by the hybrid circuit 140. When the transistor pair Q4, Q5 turns on, it closes the d.c. loop established by the two-wire line (the ring and tip conductors 144 and 145), and when the transistor pair Q4, Q5 turns off it opens the d.c. loop in the central office.

Thus, the response of the switching arrangement established by transistors Q4-Q7 operates to close the d.c. loop in the central office to energize the line relay RY1 and thus connect the subscriber's or customers line to the automatic dial equipment in the central office when telephone 48 is brought off-hook. Additionally, the response of the transistor arrangement Q4–Q7 to the subscriber's telephone dial breaks opens and closes the d.c. loop in the central office to thereby pulse the direct current flowing in the d.c. loop for transmitting the dialing information to the dial equipment in the central office. This transistor switching arrangement in hybrid circuit 140 thus replaces and performs the function of a separate relay (usually called an off-hook relay) which is normally used with standard or conventional hybrid circuits and carrier channel equipment at the central office for repeating the hook state and dial breaks of the subscriber's telephone.

Although the circuitry comprising transistors Q4 and Q5 and feedback network 214 acts as a constant voltage source for a.c. signals, it appears as a constant current source for d.c. since network 214 establishes only an a.c. feedback.

A device or component (e.g., a transistor or amplifier) is considered to drive some other component (e.g., a two-wire line or port or an impedance) or device (e.g., a transistor) if it applies a voltage to or feeds a current (a.c. or d.c. or both) or a signal to the other component or device. Also, a signal is considered to drive a component (e.g., a two-wire line or port) or a device (e.g., a transistor or an amplifier) if it acts on the component or device in some manner such as varying the current through the component or device or varying a voltage on the component or device.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In an electronic hybrid for coupling a two-wire line to a four-wire line and having a two-wire port adapted to be connected to the two-wire line for receiving incoming information signals from said two-wire line and applying outgoing information signals to said two-wire line, separate receive and transmit ports adapted to be connected to said four-wire line, means for coupling said incoming information signals from said two-wire port to said transmit port, and a circuit connected to said receive and two-wire ports for converting a single-ended information signal received at said receive port into a balanced differential signal voltage and for applying said differential signal voltage to said two-wire port for application to said two-wire line, the improvement comprising means forming a part of said circuit and rendered effective by the impression of longitudinal signal voltage components at the terminals of said two-wire port for adjusting the voltage impressed on said terminals in a direction that cancels said longitudinal voltage components.

2. In a central office terminal circuit for a telephone carrier system, a communication receiver for receiving and detecting a first carrier signal of pre-selected frequency to recover a modulating signal from the first carrier signal, a transmitter for transmitting a second carrier signal of pre-selected frequency, and an electronic hybrid for coupling said receiver and said transmitter to tip and ring conductors in a central office, said hybrid having (a) first circuit means connected between said receiver and said tip and ring conductors for coupling the recovered modulating signal to said tip and ring conductors and (b) second circuit means for coupling an intelligence signal from the tip and ring conductors to said transmitter for modulating said second carrier signal, said first circuit means including transistor means, and means for connecting said transistor means across said tip and ring conductors to provide a current path for conducting central office battery current through the tip and ring conductors whenever said transistor means is rendered conductive, said receiver including sensing means for producing a pre-selected d.c. voltage change in response to the detection of said first carrier signal, and means forming a part of said hybrid and connected between said sensing means and said transistor means for biasing said transistor means into conduction in response to said pre-selected d.c. voltage change whereby said current path for conducting central office battery current is established upon reception and detection of said first carrier signal at said receiver.

3. In an electronic hybrid for coupling a two-wire line to a four-wire line and having a two-wire port adapted to be connected to the two-wire line for receiving incoming information signals from the two-wire line and for applying outgoing information signals to said two-wire line, separate receive and transmit ports adapted to be connected to said four-wire line, means for coupling the incoming information signals from said two-wire port to said transmit port, first and second transistors each having first and second signal terminals, means for coupling a single-ended information signal received at said receive port to the first terminal of said first transistor, circuit means connected to and cooperating with said transistors for converting said single-ended information signal into a balanced differential signal having one signal component on the second terminal of said first transistor and the other signal component on the second terminal of second transistor, and means coupling said second terminals to said two-wire port for applying said differential signal to said two-wire port, said circuit means comprising a feedback circuit connected between the first and second terminals of said first transistor and also between the first and second terminals of said second transistor.

4. In an electronic hybrid for coupling a two-wire line to a four-wire line and having a two-wire port adapted to be connected to the two-wire line for receiving incoming information signals from the two-wire line and for applying outgoing information signals to said two-wire line, separate receive and transmit ports adapted to be connected to said four-wire line, means for coupling said incoming information signals from said two-wire port to said transmit port, first and second bipolar transistors, means for coupling a single-ended information signal received at said receive port to the base of said first transistor, a feedback circuit connected between the collector and base of said first transistor and also between the collector and base of said second transistor, said feedback circuit including means for producing a feedback signal that varies as a function of said single-ended signal, said first and second transistors being controlled by said feedback signal for converting said single-ended signal into a balanced differential signal having one signal component on the collector of said first transistor and the other signal component on the collector of said second transistor, and means coupling the collectors of said transistors to said two-wire port for applying the differential signal to said two-wire port.

5. The electronic hybrid defined in claim 4 wherein said means for producing said feedback signal comprises an amplifier, said feedback circuit further including means connecting the output of said amplifier to the bases of said first and second transistors, and there being means connecting the collectors of said first and second transistors to one of the pair of inputs of said amplifier.

6. The electronic hybrid defined in claim 5 wherein said means coupling the output of said amplifier to the bases of said transistors comprises a first voltage divider, and wherein said means coupling the collectors of said transistors to said one of said inputs of said amplifier comprises a second voltage divider.

7. The electronic hybrid defined in claim 5 wherein said means connecting the output of said amplifier to the bases of said transistors comprises a first resistive voltage divider, wherein said means connecting the collectors of said transistors to said one of said inputs of said amplifier comprises a second resistive voltage divider interconnecting the collectors of said transistors and having a first node connected to said one of said inputs of said amplifier, and wherein a third resistive voltage divider is connected across the terminals of a d.c. voltage supply and has a second node connected to the other of the inputs of said amplifier to apply thereto a fixed reference voltage of pre-selected value, said amplifier being responsive to the voltages at said first and second nodes to produce an output voltage that varies as a function of the difference between the voltages at said first and second nodes, such that feedback voltages varying with said output voltage are applied to the bases of said transistors by said first divider.

8. The electronic hybrid defined in claim 7 wherein said second and third dividers have pre-selected resistance values that cause the voltage at said one of said inputs of said amplifier to equal said fixed reference voltage at said other of said inputs of said amplifier when the collector voltages of said transistors are equal to each other.

9. The electronic hybrid defined in claim 8 wherein a pair of terminals define said two-wire port, and wherein said second voltage divider is bridged across the terminals defining said two-wire port.

10. The electronic hybrid defined in any one of the preceding claims 7–9 wherein said means for coupling the incoming information signals from said two-wire port to said transmit port includes differential amplifier means having a differential input, means connecting said differential input to said two-wire port such that the output of said differential amplifier means has a first voltage component that varies as a function of said incoming information signal and a second voltage component that varies as a function of said differential signal, and means connected to the output of said amplifier in said feedback circuit and utilizing the output voltage of said amplifier to cancel said second voltage component which is supplied at the output of said differential amplifier means.

11. The electronic hybrid defined in any one of the preceding claims 4–9 wherein said transistors are of opposite polarity.

12. The electronic hybrid defined in any one of the preceding claims 7–9 wherein said amplifier is of the non-inverting type, and wherein said transistors are of opposite polarity such that the collector voltages of said transistors are driven in opposite directions by a change in the voltage at the output of said amplifier.

13. In an electronic hybrid for coupling a two-wire line to a four-wire line and having a two-wire port adapted to be connected to the two-wire line, and separate receive and transmit ports adapted to be connected to aid four-wire line, a signal source resistance, at least one bipolar transistor having its collector connected to said source resistance, means for coupling said receive port to the base of said transistor for applying an information signal received at said receive port to the base of said transistor, said transistor being responsive to said information signal for conducting collector current through said source resistance, the source resistance and the impedance of the collector of said transistor defining a signal source impedance for developing an outgoing signal that varies as a function of said information signal, means for coupling said outgoing signal to said two-wire port for application to said two-wire line, and negative a.c. feedback means interposed between the collector and base of said transistor for reducing the magnitude of collector impedance of said transistor.

* * * * *